US009591309B2

(12) United States Patent
Dunaisky et al.

(10) Patent No.: US 9,591,309 B2
(45) Date of Patent: Mar. 7, 2017

(54) PROGRESSIVE LOSSY MEMORY COMPRESSION

(71) Applicant: NVIDIA Corporation, Santa Clara, CA (US)

(72) Inventors: Jonathan Dunaisky, Fort Collins, CO (US); Eric B. Lum, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 174 days.

(21) Appl. No.: 13/829,547

(22) Filed: Mar. 14, 2013

(65) Prior Publication Data
US 2014/0184627 A1    Jul. 3, 2014

Related U.S. Application Data

(63) Continuation-in-part of application No. 13/732,313, filed on Dec. 31, 2012.

(51) Int. Cl.
| | | |
|---|---|---|
| *G06T 9/00* | (2006.01) | |
| *H04N 19/13* | (2014.01) | |
| *H04N 19/593* | (2014.01) | |
| *H04N 19/91* | (2014.01) | |
| *H04N 19/132* | (2014.01) | |
| *H04N 19/14* | (2014.01) | |
| *H04N 19/186* | (2014.01) | |

(52) U.S. Cl.
CPC ........... *H04N 19/13* (2014.11); *H04N 19/132* (2014.11); *H04N 19/14* (2014.11); *H04N 19/186* (2014.11); *H04N 19/593* (2014.11); *H04N 19/91* (2014.11)

(58) Field of Classification Search
CPC ........ G09G 2340/02; G09G 2300/0452; G06T 9/00
USPC ........................................................ 345/555
See application file for complete search history.

(56) References Cited

U.S. PATENT DOCUMENTS

| | | |
|---|---|---|
| 5,032,903 A | 7/1991 | Suzuki et al. |
| 5,081,594 A | 1/1992 | Horsley |
| 5,212,633 A | 5/1993 | Franzmeier |
| 5,237,460 A | 8/1993 | Miller et al. |
| 5,287,438 A | 2/1994 | Kelleher |
| 5,313,287 A | 5/1994 | Barton |
| 5,335,322 A | 8/1994 | Mattison |
| 5,392,396 A | 2/1995 | Macinnis |

(Continued)

FOREIGN PATENT DOCUMENTS

| | | |
|---|---|---|
| EP | 2143280 | 1/2010 |
| TW | 200820131 | 5/2008 |

OTHER PUBLICATIONS

John M. Danskin, et al., Espacenet Bibliographic Data: TW200820131, Abstract of TW200820131, May 1, 2008, p. 1, Taiwan.
A Parallel Alogorithm for Polygon Rasterization Juan Pineda Jun. 1988 ACM.

(Continued)

*Primary Examiner* — Hau Nguyen

(57) ABSTRACT

A method, in one embodiment, can include performing difference transformation of image samples. In addition, the method can also include performing length selection. The method can also include performing a prioritized ordering of difference data. Furthermore, the method can include performing packing that includes utilizing varying sized bit fields to produce a lossy compressed representation.

20 Claims, 9 Drawing Sheets

(56) References Cited

U.S. PATENT DOCUMENTS

| | | |
|---|---|---|
| 5,432,898 A | 7/1995 | Curb et al. |
| 5,446,836 A | 8/1995 | Lentz et al. |
| 5,452,104 A | 9/1995 | Lee |
| 5,452,412 A | 9/1995 | Johnson, Jr. et al. |
| 5,483,258 A | 1/1996 | Cornett et al. |
| 5,570,463 A | 10/1996 | Dao |
| 5,594,854 A | 1/1997 | Baldwin et al. |
| 5,623,692 A | 4/1997 | Priem et al. |
| 5,633,297 A | 5/1997 | Valko et al. |
| 5,664,162 A | 9/1997 | Dye |
| 5,748,904 A | 5/1998 | Huang et al. |
| 5,815,162 A | 9/1998 | Levine |
| 5,854,631 A | 12/1998 | Akeley et al. |
| 5,854,637 A | 12/1998 | Sturges |
| 5,872,902 A | 2/1999 | Kuchkuda et al. |
| 5,977,987 A | 11/1999 | Duluk, Jr. |
| 5,990,904 A | 11/1999 | Griffin |
| 6,028,608 A | 2/2000 | Jenkins |
| 6,034,699 A | 3/2000 | Wong et al. |
| 6,072,500 A | 6/2000 | Foran et al. |
| 6,104,407 A | 8/2000 | Aleksic et al. |
| 6,104,417 A | 8/2000 | Nielsen et al. |
| 6,115,049 A | 9/2000 | Winner et al. |
| 6,118,394 A | 9/2000 | Onaya |
| 6,128,000 A | 10/2000 | Jouppi et al. |
| 6,137,918 A | 10/2000 | Harrington et al. |
| 6,160,559 A | 12/2000 | Omtzigt |
| 6,188,394 B1 | 2/2001 | Morein et al. |
| 6,201,545 B1 | 3/2001 | Wong et al. |
| 6,204,859 B1 | 3/2001 | Jouppi et al. |
| 6,219,070 B1 | 4/2001 | Baker et al. |
| 6,249,853 B1 | 6/2001 | Porterfield |
| 6,359,623 B1 | 3/2002 | Larson |
| 6,362,819 B1 | 3/2002 | Dalal et al. |
| 6,366,289 B1 | 4/2002 | Johns |
| 6,429,877 B1 | 8/2002 | Stroyan |
| 6,437,780 B1 | 8/2002 | Baltaretu et al. |
| 6,452,595 B1 | 9/2002 | Montrym et al. |
| 6,469,707 B1 | 10/2002 | Voorhies |
| 6,490,058 B1 | 12/2002 | Takabatake et al. |
| 6,501,564 B1 | 12/2002 | Schramm et al. |
| 6,504,542 B1 | 1/2003 | Voorhies et al. |
| 6,522,329 B1 | 2/2003 | Ihara et al. |
| 6,523,102 B1 | 2/2003 | Dye et al. |
| 6,525,737 B1 | 2/2003 | Duluk, Jr. et al. |
| 6,529,207 B1 | 3/2003 | Landau et al. |
| 6,545,684 B1 | 4/2003 | Dragony et al. |
| 6,606,093 B1 | 8/2003 | Gossett et al. |
| 6,614,444 B1 | 9/2003 | Duluk, Jr. et al. |
| 6,624,823 B2 | 9/2003 | Deering |
| 6,633,197 B1 | 10/2003 | Sutardja |
| 6,633,297 B2 | 10/2003 | McCormack et al. |
| 6,646,639 B1 | 11/2003 | Greene et al. |
| 6,664,961 B2 | 12/2003 | Ray et al. |
| 6,671,000 B1 | 12/2003 | Cloutier |
| 6,683,979 B1 | 1/2004 | Walker et al. |
| 6,693,637 B2 | 2/2004 | Koneru et al. |
| 6,693,639 B2 | 2/2004 | Duluk, Jr. et al. |
| 6,697,063 B1 | 2/2004 | Zhu |
| 6,704,022 B1 | 3/2004 | Aleksic |
| 6,704,026 B2 | 3/2004 | Kurihara et al. |
| 6,717,578 B1 | 4/2004 | Deering |
| 6,741,247 B1 | 5/2004 | Fenney |
| 6,747,057 B2 | 6/2004 | Ruzafa et al. |
| 6,765,575 B1 | 7/2004 | Voorhies et al. |
| 6,778,177 B1 | 8/2004 | Furtner |
| 6,788,301 B2 | 9/2004 | Thrasher |
| 6,798,410 B1 | 9/2004 | Redshaw et al. |
| 6,819,332 B2 | 11/2004 | Baldwin |
| 6,825,847 B1 | 11/2004 | Molnar et al. |
| 6,833,835 B1 | 12/2004 | van Vugt |
| 6,901,497 B2 | 5/2005 | Tashiro et al. |
| 6,906,716 B2 | 6/2005 | Moreton et al. |
| 6,940,514 B1 | 9/2005 | Wasserman et al. |
| 6,947,057 B2 | 9/2005 | Nelson et al. |
| 6,978,317 B2 | 12/2005 | Anantha et al. |
| 7,009,607 B2 | 3/2006 | Lindholm et al. |
| 7,009,615 B1 | 3/2006 | Kilgard et al. |
| 7,061,640 B1 | 6/2006 | Maeda |
| 7,064,771 B1 | 6/2006 | Jouppi et al. |
| 7,075,681 B1 | 7/2006 | Brothers |
| 7,081,902 B1 | 7/2006 | Crow et al. |
| 7,119,809 B1 | 10/2006 | McCabe |
| 7,126,600 B1 | 10/2006 | Fowler et al. |
| 7,154,066 B2 | 12/2006 | Talwar et al. |
| 7,158,148 B2 | 1/2007 | Toji et al. |
| 7,167,259 B2 | 1/2007 | Varga |
| 7,170,515 B1 | 1/2007 | Zhu |
| 7,184,040 B1 | 2/2007 | Tzvetkov |
| 7,224,364 B1 | 5/2007 | Yue et al. |
| 7,243,191 B2 | 7/2007 | Ying et al. |
| 7,307,628 B1 | 12/2007 | Goodman et al. |
| 7,317,459 B2 | 1/2008 | Fouladi et al. |
| 7,382,368 B1 | 6/2008 | Molnar et al. |
| 7,403,212 B2 | 7/2008 | Schick et al. |
| 7,453,466 B2 | 11/2008 | Hux et al. |
| 7,479,965 B1 | 1/2009 | King et al. |
| 7,548,996 B2 | 6/2009 | Baker et al. |
| 7,551,174 B2 | 6/2009 | Iourcha et al. |
| 7,633,506 B1 | 12/2009 | Leather et al. |
| 7,692,659 B1 | 4/2010 | Molnar et al. |
| 7,791,617 B2 | 9/2010 | Crow et al. |
| 7,965,902 B1 | 6/2011 | Zelinka et al. |
| 7,978,921 B1 | 7/2011 | Donovan |
| 8,031,977 B2 | 10/2011 | Min et al. |
| 8,063,903 B2 | 11/2011 | Vignon et al. |
| 8,116,579 B2 * | 2/2012 | Fenney et al. ................. 382/240 |
| 8,427,487 B1 | 4/2013 | Crow |
| 8,605,104 B1 | 12/2013 | McAllister et al. |
| 8,660,347 B2 | 2/2014 | Tamura |
| 8,670,613 B2 | 3/2014 | McAllister et al. |
| 2001/0005209 A1 | 6/2001 | Lindholm et al. |
| 2001/0038642 A1 | 11/2001 | Alvarez et al. |
| 2002/0050979 A1 | 5/2002 | Oberoi et al. |
| 2002/0097241 A1 | 7/2002 | McCormack et al. |
| 2002/0114461 A1 | 8/2002 | Shimada |
| 2002/0140655 A1 | 10/2002 | Liang et al. |
| 2002/0158885 A1 | 10/2002 | Brokenshire et al. |
| 2002/0196251 A1 | 12/2002 | Duluk, Jr. et al. |
| 2003/0020741 A1 | 1/2003 | Boland |
| 2003/0067468 A1 | 4/2003 | Duluk, Jr. et al. |
| 2003/0076325 A1 | 4/2003 | Thrasher |
| 2003/0122815 A1 | 7/2003 | Deering |
| 2003/0194116 A1 | 10/2003 | Wong et al. |
| 2003/0201994 A1 | 10/2003 | Taylor et al. |
| 2004/0086177 A1 | 5/2004 | Zhang et al. |
| 2004/0130552 A1 | 7/2004 | Duluk, Jr. et al. |
| 2004/0183801 A1 | 9/2004 | Deering |
| 2004/0196285 A1 | 10/2004 | Rice et al. |
| 2004/0207642 A1 | 10/2004 | Crisu et al. |
| 2004/0246251 A1 | 12/2004 | Fenney et al. |
| 2005/0030314 A1 | 2/2005 | Dawson |
| 2005/0041037 A1 | 2/2005 | Dawson |
| 2005/0066148 A1 | 3/2005 | Luick |
| 2005/0122338 A1 | 6/2005 | Hong et al. |
| 2005/0134588 A1 | 6/2005 | Aila et al. |
| 2005/0134603 A1 | 6/2005 | Iourcha et al. |
| 2005/0179698 A1 | 8/2005 | Vijayakumar et al. |
| 2005/0213128 A1 | 9/2005 | Imai et al. |
| 2005/0259100 A1 | 11/2005 | Teruyama |
| 2006/0170690 A1 | 8/2006 | Leather |
| 2006/0170703 A1 | 8/2006 | Liao |
| 2006/0203005 A1 | 9/2006 | Hunter |
| 2006/0245001 A1 | 11/2006 | Lee et al. |
| 2006/0267981 A1 | 11/2006 | Naoi |
| 2006/0282604 A1 | 12/2006 | Temkine et al. |
| 2007/0008324 A1 | 1/2007 | Green |
| 2007/0129990 A1 | 6/2007 | Tzruya et al. |
| 2007/0139440 A1 | 6/2007 | Crow et al. |
| 2007/0268298 A1 | 11/2007 | Alben et al. |
| 2007/0273689 A1 | 11/2007 | Tsao |
| 2007/0296725 A1 | 12/2007 | Steiner et al. |
| 2008/0024497 A1 | 1/2008 | Crow et al. |
| 2008/0024522 A1 | 1/2008 | Crow et al. |

(56) References Cited

U.S. PATENT DOCUMENTS

| | | | |
|---|---|---|---|
| 2008/0034238 A1 | 2/2008 | Hendry et al. | |
| 2008/0100618 A1 | 5/2008 | Woo et al. | |
| 2008/0158233 A1 | 7/2008 | Shah et al. | |
| 2008/0247641 A1 | 10/2008 | Rasmusson et al. | |
| 2008/0273218 A1 | 11/2008 | Kitora et al. | |
| 2009/0033669 A1 | 2/2009 | Hochmuth et al. | |
| 2009/0080531 A1* | 3/2009 | Hashiguchi et al. | 375/240.24 |
| 2009/0153540 A1 | 6/2009 | Blinzer et al. | |
| 2009/0295816 A1 | 12/2009 | Kallio | |
| 2010/0060629 A1 | 3/2010 | Rasmusson et al. | |
| 2010/0226441 A1 | 9/2010 | Tung et al. | |
| 2012/0050303 A1 | 3/2012 | McAllister et al. | |
| 2012/0113787 A1 | 5/2012 | Komma et al. | |
| 2012/0183215 A1 | 7/2012 | Van Hook et al. | |
| 2013/0021352 A1 | 1/2013 | Wyatt et al. | |
| 2013/0249897 A1 | 9/2013 | Dunaisky et al. | |
| 2013/0290281 A1 | 10/2013 | Yokoi et al. | |
| 2014/0184601 A1 | 7/2014 | Dunaisky et al. | |
| 2014/0184612 A1 | 7/2014 | Dunaisky et al. | |
| 2014/0184627 A1 | 7/2014 | Dunaisky et al. | |

OTHER PUBLICATIONS

A VLSI Architecture for Updating Raster-Scan Displays Satish Gupta, Robert F. Sproull, Ivan E. Sutherland Aug. 1981 ACM SIGGRAPH Computer Graphics, Proceedings of the 8th Annual Conference on Computer Graphics and Interactive Techniques SIGGRAPH '81, vol. 15 Issue Publisher: ACM Press.

Blythe, OpenGL section 3.4.1, Basic Line Segment Rasterization, Mar. 29, 1997, pp. 1-3.

Boyer, et al.; "Discrete Analysis for Antialiased Lines;" Eurographics 2000; 3 Pages.

Crow; "The Use of Grayscale for Improves Raster Display of Vectors and Characters;" University of Texas, Austin, Texas; Work supported by the National Science Foundation unser Grants MCS 76-83889; pp. 1-5: ACM Press.

Foley, J. "Computer Graphics: Principles and Practice", 1987, Addison-Wesley Publishing, 2nd Edition, p. 545-546.

Fuchs; "Fast Spheres Shadow, Textures, Transparencies, and Image Enhancements in Pixel-Planes"; ACM; 1985; Department of Computer Science, University of North Carolina at Chapel Hill, Chapel Hill, NC 27514.

* cited by examiner

500

| Index (packed encoding) | Length | Difference value range |
|---|---|---|
| 0 | 0 | 0 |
| 1 | 2 | (-2, 1) |
| 2 | 3 | (-4, 3) |
| 3 | 4 | (-8, 7) |
| 4 | 5 | (-16. 15) |
| 5 | 6 | (-32, 31) |
| 6 | 7 | (-64, 63) |
| 7 | 8, 10, or 11 * | All others (difference is truncated to the length, e.g., sign or any overflow bits are not kept – note: the result is still lossless for the given encoded length.) |

FIG. 5

| Index (packed encoding) | Length | Difference value range |
|---|---|---|
| 0 | 0 | 0 |
| 1 | 2 | (-2, 1) |
| 2 | 3 | (-4, 3) |
| 3 | 4 | (-8, 7) |
| 4 | 5 | (-16, 15) |
| 5 | 6 | (-32, 31) |
| 6 | 7 | (-64, 63) |
| 7 | 8 | (-128, 127) |
| 8 | 9 | (-256, 255) |
| 9 | 10 | (-512, 511) |
| 10 | 11 | (-1024, 1023) |
| 11 | 12 | (-2048, 2047) |
| 12 | 13 * (alpha 0.0) | (-4096, 4095) |
| 13 | 14 * (alpha 1.0) | (-8192, 8191) |
| 14 | 15 | (-16384, 16383) |
| 15 | 16 | All others(difference is truncated to the length, e.g., sign or any overflow bits are not kept – note: the result is still lossless for the given encoded length.) |

FIG. 6

| Bit field | Descending half of 4:2 | Size | Description |
|---|---|---|---|
| 1:0 | 510:511 | 2 bits | Format (0=8-8-8-8, 1=8-8-8-8 with alpha 0.0 or 1.0, 2=2-10-10-10, 3=10-11-11) |
| 2:2 | 509:509 | 1 bit | Channel decorrelation selection (0=not decorrelated; 1=decorrelation used, e.g., R', B' encoded) |
| 3:3 | 508:508 | 1 bit | Channel R Length selection (0=by pairs, 1=by maximum) |
| 4:4 | 507:507 | 1 bit | Channel G Length selection |
| 5:5 | 506:506 | 1 bit | Channel B Length selection |
| <var>:6 | <var>:505 | 0 or 1 bits | Channel A Length selection, only present if format field is 8-8-8-8 or 2-10-10-10 |
| <var>:<var> | <var>:<var> | 24 or 3 bits | Lengths for channel R (8 * 3 bits if by pairs; 3 bits if by maximum) |
| <var>:<var> | <var>:<var> | 24 or 3 bits | Lengths for channel G (8 * 3 bits if by pairs; 3 bits if by maximum) |
| <var>:<var> | <var>:<var> | 24 or 3 bits | Lengths for channel B (8 * 3 bits if by pairs; 3 bits if by maximum) |
| <var>:<var> | <var>:<var> | 24, 3, or 0 bits | Lengths for channel A (8 * 3 bits if by pairs; 3 bits if by maximum; 0 bits if format is with alpha 0/1 or 10-11-11) |
| <var>:<var> | <var>:<var> | 8, 8, 10, or 11 bits, respectively by format. | Anchor R channel, R' stored if decorrelation selected. |
| <var>:<var> | <var>:<var> | 8, 8, 10, or 11 bits, respectively by format. | Anchor G channel |
| <var>:<var> | <var>:<var> | 8, 8, 10, or 11 bits, respectively by format. | Anchor B channel, B' stored if decorrelation selected |
| <var>:<var> | <var>:<var> | 8, 1, 2, or 0 bits, respectively by format. | Anchor A channel |
| <var>:<var> | <var>:<var> | remaining bits | Consecutively bit-packed differences, according to the lengths selected for each channel-pair. * |

| Bitfield | Descending half of 4:2 | Size | Description |
|---|---|---|---|
| 0:0 | 511:511 | 1 bit | Channel decorrelation selection (0=not decorrelated; 1=decorrelation used, e.g., R', B' encoded) |
| 1:1 | 510:510 | 1 bit | Channel R Length selection (0=by pairs, 1=by maximum) |
| 2:2 | 509:509 | 1 bit | Channel G Length selection |
| 3:3 | 508:508 | 1 bit | Channel B Length selection |
| 4:4 | 507:507 | 1 bit | Channel A Length selection |
| <var>:5 | <var>:506 | 16 or 4 bits | Lengths for channel R (4 * 4 bits if by pairs; 4 bits if by maximum) |
| <var>:<var> | <var>:<var> | 16 or 4 bits | Lengths for channel G (4 * 4 bits if by pairs; 4 bits if by maximum) |
| <var>:<var> | <var>:<var> | 16 or 4 bits | Lengths for channel B (4 * 4 bits if by pairs; 4 bits if by maximum) |
| <var>:<var> | <var>:<var> | 16 or 4 bits | Lengths for channel A (4 * 4 bits if by pairs; 4 bits if by maximum) |
| <var>:<var> | <var>:<var> | 16 bits | Anchor R channel, R' stored if decorrelation selected. |
| <var>:<var> | <var>:<var> | 16 bits | Anchor G channel |
| <var>:<var> | <var>:<var> | 16 bits | Anchor B channel, B' stored if decorrelation selected |
| <var>:<var> | <var>:<var> | 16 or 0 bits | Anchor A channel, 0 bits if max. length indicates uniform 0.0 or 1.0. |
| <var>:<var> | <var>:<var> | 0 to 171 bits (or more for 4:2) | Consecutively bit-packed differences, according to the lengths selected for each channel-pair. * |

FIG. 8

PROGRESSIVE LOSSY MEMORY COMPRESSION

CROSS-REFERENCE TO RELATED APPLICATION

This application is a continuation-in-part of co-pending U.S. application Ser. No. 13/732,313, filed Dec. 31, 2012, entitled "Variable-Width Differential Memory Compression," by Jonathan Dunaisky et al., which is hereby incorporated by reference.

BACKGROUND

A conventional computing system or computing device typically includes at least one graphics processing unit (GPU) that generates images within a frame buffer that will eventually be transmitted to a display. As software for computing systems and devices involve more and more realistic images, one challenge is to continually increase the image throughput of the GPU in order to improve a user's interaction and experience with the software operating on the computing system or device.

SUMMARY

A method, in one embodiment, can include performing difference transformation of image samples. In addition, the method can also include performing length selection. The method can also include performing a prioritized ordering of difference data. Furthermore, the method can include performing packing that includes utilizing varying sized bit fields to produce a lossy compressed representation. In an embodiment, the performing a prioritized ordering mentioned above may further include performing a prioritized ordering of difference data to minimize loss after compression, thereby allowing a fixed memory storage compression ratio.

A system, in an embodiment, can include a graphics processor and a frame buffer coupled to the graphics processor. It is noted that the graphics processor is for performing a method that can include performing difference transformation of image samples. Additionally, the method can also include performing length selection. The method can also include performing a prioritized ordering of difference data. Moreover, the method can include performing packing that includes utilizing varying sized bit fields to produce a lossy compressed representation. In an embodiment, the performing a prioritized ordering mentioned above may further include performing a prioritized ordering of difference data to minimize loss after compression, thereby allowing a fixed memory storage compression ratio.

A method, in an embodiment, can include performing difference transformation of image samples. In addition, the method can include performing length selection that includes performing length encoding. Furthermore, the method can also include performing a prioritized ordering of difference data. The method can also include performing packing that includes utilizing varying sized bit fields to produce a lossy compressed representation. In an embodiment, the performing a prioritized ordering mentioned above may further include performing a prioritized ordering of difference data to minimize loss after compression, thereby allowing a fixed memory storage compression ratio.

While particular embodiments in accordance with the invention have been specifically described within this Summary, it is noted that the invention and the claimed subject matter are not limited in any way by these embodiments.

BRIEF DESCRIPTION OF THE DRAWINGS

Within the accompanying drawings, various embodiments in accordance with the invention are illustrated by way of example and not by way of limitation. It is noted that like reference numerals denote similar elements throughout the drawings. The drawings referred to in this description should not be understood as being drawn to scale except if specifically noted.

FIG. 5 is a table in accordance with an embodiment of the invention.

FIG. 6 is another table in accordance with one embodiment of the invention.

FIG. 7 is yet another table in accordance with an embodiment of the invention.

FIG. 8 is still another table in accordance with an embodiment of the invention.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details or with equivalents thereof. In other instances, well known methods, procedures, components, and circuits have not been described in detail as not to unnecessarily obscure aspects of the invention.

Various embodiments in accordance with the invention can involve progressive lossy memory compression in order to reduce the bandwidth of accesses that a graphics processing unit (GPU) performs to memory (e.g., a frame buffer). In an embodiment, the progressive lossy memory compression can apply to multi-sampled surfaces of an image since the reduction ratio (e.g., number of samples in a group to be reduced to one) can be identical to the number of samples in a pixel. Furthermore, the progressive lossy memory compression can also be applied to aliased (e.g., 1 sample per pixel) surfaces of an image. It is noted that within various embodiments, the progressive lossy memory compression can apply to, but is not limited to, image color data, depth data, stencil data, or any other memory (or frame buffer) contents. In addition, within various embodiments, a progressive lossy memory compression can involve one or more portions of an image to be accessed from memory (e.g., frame buffer). In various embodiments, the size and label of a portion of an image can be implemented in a wide variety of ways. For example, in an embodiment, a "tile" of an image may be a small rectangular portion of a frame buffer, such as, but not limited to, 256 bytes made up of 64 bytes wide*4 lines high. In addition, in an embodiment, a "subpacket" of an image may be a small rectangular portion of a tile, such as, but not limited to, 16 bytes wide*2 lines high.

Figure 1:
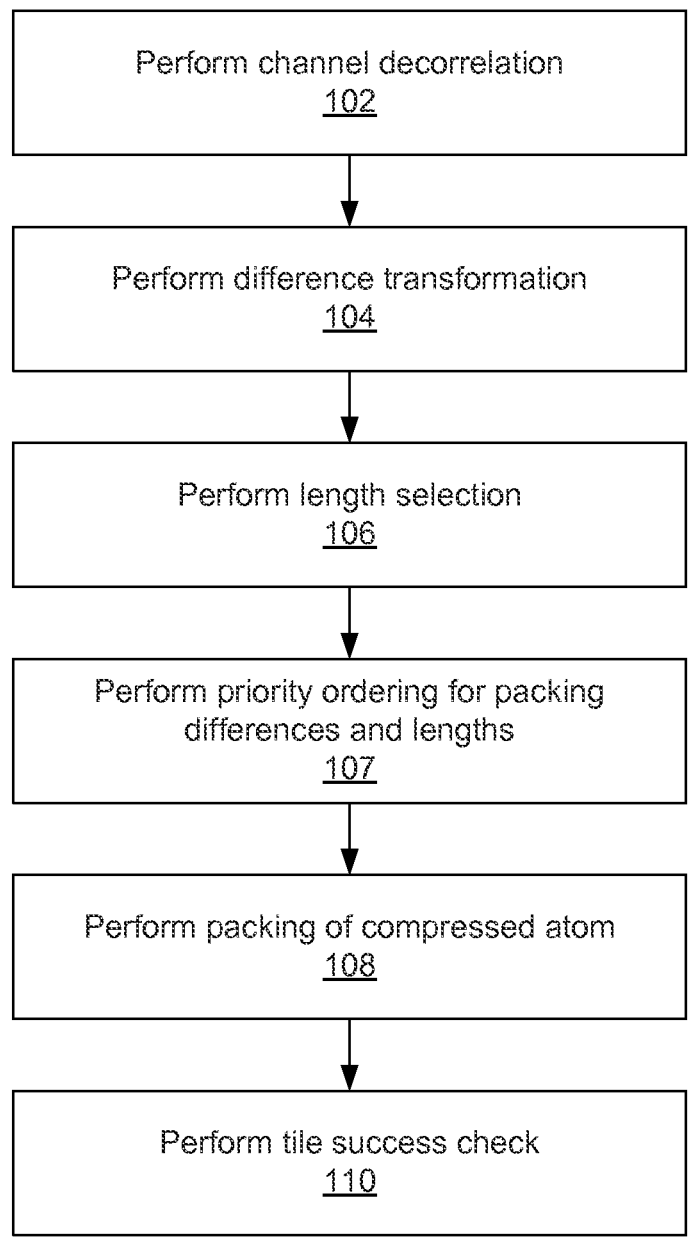
FIG. 1 is a flow diagram of a method in accordance with various embodiments of the invention.

FIG. 1 is a flow diagram of a method 100 for performing a progressive lossy memory compression in accordance with various embodiments of the invention. Although specific operations are disclosed in FIG. 1, such operations are examples. The method 100 may not include all of the operations illustrated by FIG. 1. Also, method 100 may include various other operations and/or variations of the operations shown. Likewise, the sequence of the operations of flow diagram 100 can be modified. It is appreciated that not all of the operations in flow diagram 100 may be performed. In various embodiments, one or more of the operations of method 100 can be controlled or managed by software, by firmware, by hardware or by any combination thereof, but is not limited to such. Method 100 can include processes of embodiments of the invention which can be controlled or managed by a processor(s) and electrical components under the control of computer or computing device readable and executable instructions (or code). The computer or computing device readable and executable instructions (or code) may reside, for example, in data storage features such as computer or computing device usable volatile memory (e.g., random access memory (RAM), static RAM, dynamic RAM, etc.), computer or computing device usable non-volatile memory (e.g., read only memory (ROM), programmable ROM, flash memory, erasable programmable read only memory (EPROM), electrically erasable programmable read only memory (EEPROM), etc.), and/or computer or computing device usable mass data storage (e.g., magnetic or optical disk or disk drive, hard drive, etc.). However, the computer or computing device readable and executable instructions (or code) may reside in any type of computer or computing device readable medium or memory.

In an embodiment of method 100, a progressive lossy memory (e.g., frame buffer) compression can rely on differences between neighboring image samples, but instead of packing these differences into fixed-bit size templates, uses a variable-length packing. In addition, for a progressive lossy memory compression, in order to unpack, the lengths can also be encoded into the compression data. In one embodiment, two different methods of encoding the lengths can be used, and the best (e.g., shortest) on a per-channel basis, are chosen.

It is noted that in an embodiment of method 100, a progressive lossy memory compression can operate on 2 subpackets at a time, compressing them to a single atom (this is changed for a 4:2 compression atom, which is described herein). In one embodiment, in the case of a 2:1 compression atom, all 4 pairs of subpackets in a tile can each compress to 1 subpacket in order for the tile to be written to the compressed state of the progressive lossy memory compression of method 100.

In an embodiment, compressing in accordance with a progressive lossy memory compression of method 100 may include, but is not limited to, performing channel decorrelation; performing difference transformation that includes a prioritized order of storing difference data; performing length selection, perform packing of compressed atom; and perform a tile success check. It is noted that in an embodiment, decompressing from progressive lossy memory compression can involve reversing these operations. It is pointed out that a progressive lossy memory compression of method 100 can apply to, but is not limited to, image color data, depth data, stencil data, or any other memory (or frame buffer) contents.

At operation 102, channel decorrelation can be performed. It is pointed out that operation 102 can be implemented in a wide variety of ways. For example, in an embodiment, the R (red), G (green), B (blue) channels often correlate well with each other. In order to exploit this to minimize the bit size of the differences in later steps or operations, a decorrelation can be performed at operation 102 that is loosely based on RGB to YUV conversions:

$$R'=R-G$$

$$B'=B-G$$

Note that the decorrelation at operation 102 can be an integer operation, regardless of original channel format. In addition, when R' or B' have been encoded, decompression will reconstitute R and B by adding G (e.g., R=R'+G), and wrapping is taken advantage of to store R' and G' in the same channel size (e.g., 8, 10, 11, or 16 bits depending on format). Furthermore, channels at operation 102 are assumed ordered R, G, B, A (alpha). It is noted that this works for formats ordered B, G, R, A as well, since the decorrelation at operation 102 is identical to that of B, G, R, A ordered formats (e.g., R and B are swapped but the decorrelation and reverse-decorrelation upon decompression do not need to be aware of that). Operation 102 can be implemented in any manner similar to that described herein, but is not limited to such. It is pointed out that in an embodiment, the decorrelation at operation 102 would usually apply to color and not apply to depth, stencil, and the like.

Figure 2:
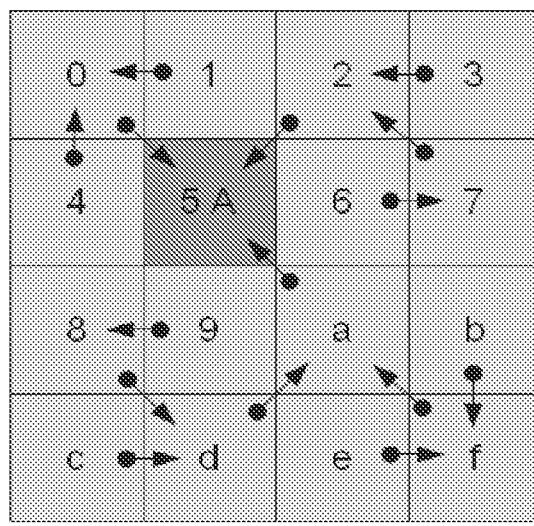
FIG. 2 illustrates a comparison rule in accordance with an embodiment of the invention.
Figure 3:
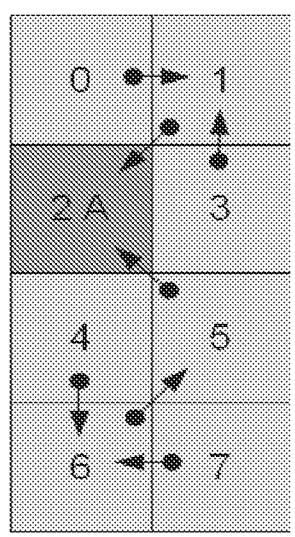
FIG. 3 illustrates another comparison rule in accordance with an embodiment of the invention.

At operation 104 of FIG. 1, difference transformation can be performed. It is noted that operation 104 can be implemented in a wide variety of ways. For example, in one embodiment, differences are taken from the sample values according to a comparison rule at operation 104. The comparison rule at operation 104 describes which sample is an anchor, and for every other sample, which neighboring sample its difference is taken from. In one embodiment, for 32-bit color formats (C32), 2 subpackets cover a 4×4 grid of samples. FIG. 2 illustrates a comparison rule used for C32 formats in accordance with an embodiment of the invention. Additionally, in one embodiment, for 64-bit color formats (C64), 2 subpackets cover a 2×4 grid of samples. FIG. 3 illustrates a comparison rule used for C64 formats in accordance with an embodiment of the invention.

Specifically, it is pointed out that within both FIGS. 2 and 3, the darker shaded square indicates the anchor sample, and the arrows indicate each non-anchor sample's comparison neighbor. In an embodiment, the anchor sample's channel values can be stored in full in the compressed representation. In addition, differences for the other sample values are signed two's-complement results of subtracting from each sample's channel's values its neighboring sample's via the comparison rule, represented by the arrows in FIGS. 2 and 3. Within FIGS. 2 and 3, it is note that by using diagonals shortens the paths between samples, thereby allowing for further distanced samples to be encoded before closer ones. Note that in an embodiment, both the original channel R and B values, as well as the decorrelated channel values R' and B' can go through this calculation.

In an embodiment, note that all C32 and C64 formats can be progressive lossy memory compressed, with the format determining the types of compression available. For example, in an embodiment, the C64 difference transformation assumes 4 channels of 16 bits each, and the values are treated as unsigned integers, regardless of actual format. In addition, in an embodiment, the C32 difference transformation also treats all values as unsigned integers. However, for C32, progressive lossy memory compression supports 2-10-10-10 and 10-11-11 formats, along with the 8-8-8-8. For 10-11-11 format, in one embodiment, differences for the 10-bit B channel can be computed based on B being treated as if it were 11 bits (e.g., B channels are left shifted 1 bit before differenced), in order to assist decorrelation against the 11 bit G channel. Operation 104 can be implemented in any manner similar to that described herein, but is not limited to such.

Figure 4:
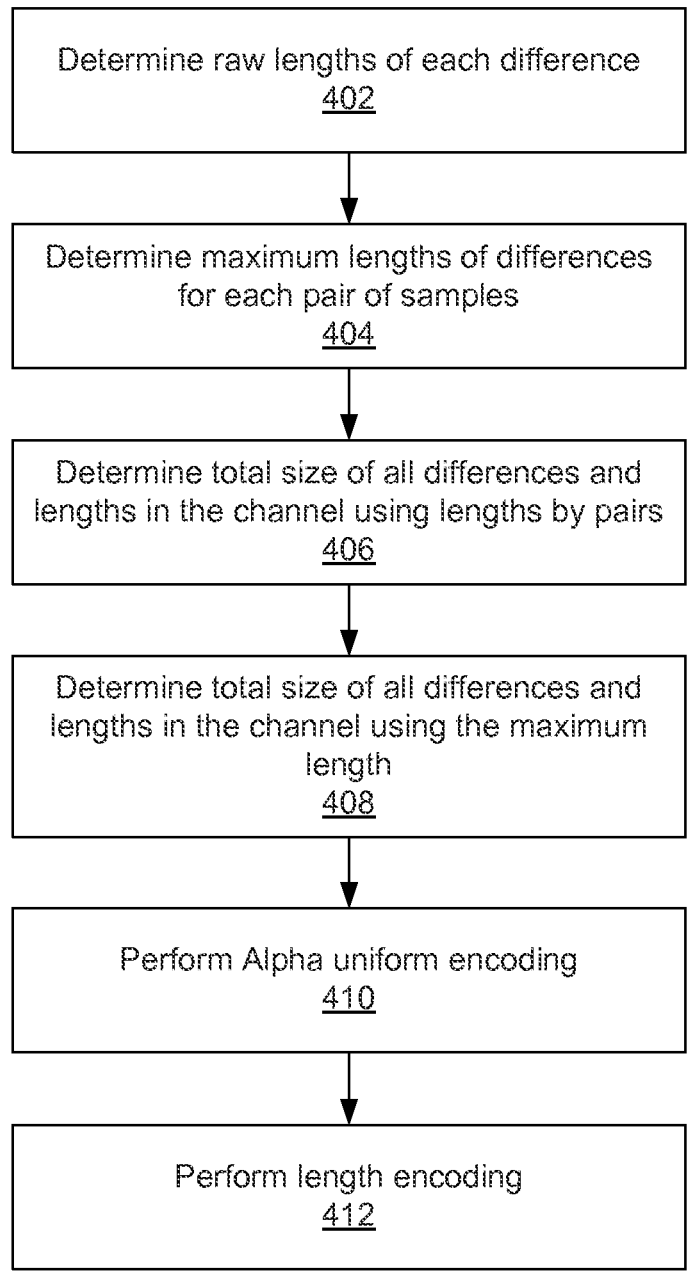
FIG. 4 is a flow diagram of a method in accordance with various embodiments of the invention.

At operation 106, length selection can be performed. It is pointed out that operation 106 can be implemented in a wide variety of ways. For example, FIG. 4 is a flow diagram of a method 400 for performing a length selection in accordance with various embodiments of the invention. As such, in an embodiment, operation 106 can be implemented with method 400, but is not limited to such. Note that operation 106 can be implemented in any manner similar to that described herein, but is not limited to such. FIG. 4 is described below.

As previously mentioned, FIG. 4 is a flow diagram of a method 400 for performing a length selection in accordance with various embodiments of the invention. Although specific operations are disclosed in FIG. 4, such operations are examples. The method 400 may not include all of the operations illustrated by FIG. 4. Also, method 400 may include various other operations and/or variations of the operations shown. Likewise, the sequence of the operations of flow diagram 400 can be modified. It is appreciated that not all of the operations in flow diagram 400 may be performed. In various embodiments, one or more of the operations of method 400 can be controlled or managed by software, by firmware, by hardware or by any combination thereof, but is not limited to such. Method 400 can include processes of embodiments of the invention which can be controlled or managed by a processor(s) and electrical components under the control of computer or computing device readable and executable instructions (or code). The computer or computing device readable and executable instructions (or code) may reside, for example, in data storage features such as computer or computing device usable volatile memory (e.g., RAM, static RAM, dynamic RAM, etc.), computer or computing device usable non-volatile memory (e.g., ROM, programmable ROM, flash memory, EPROM, EEPROM, etc.), and/or computer or computing device usable mass data storage (e.g., magnetic or optical disk or disk drive, hard drive, etc.). However, the computer or computing device readable and executable instructions (or code) may reside in any type of computer or computing device readable medium or memory.

In an embodiment, lengths can be computed by method 400 based on the differences computed above, along with consideration for the total size of differences plus lengths to be stored. In various embodiments, the steps or operations by method 400 to compute lengths for each channel can include, but are not limited to: determine the raw lengths of each difference (excluding the anchor, which is stored in full); determine the maximum lengths of differences for each pair of samples (e.g., pairs are consecutive in the 2 sub-packets, not the neighbors from the difference transformation); determine total size of all differences and lengths in the channel using lengths by pairs; and determine total size of all differences and lengths in the channel using the maximum length.

At operation 402 of FIG. 4, determine the raw lengths of each difference (excluding the anchor, which is stored in full). It is pointed out that operation 402 can be implemented in a wide variety of ways. For example, in an embodiment, with C32 formats, for a given difference value the raw length is defined at operation 402 as the lowest value satisfying the following values and information as shown in Table 500 of FIG. 5.

For example, within Table 500, for a difference value range of zero, the length of the stored difference is zero, and the index (packed encoding) of the length is zero. In addition, for a difference value range of (−2, 1), the length of the stored difference is 2, and the index (packed encoding) of the length is 1. Within Table 500, for a difference value range of (−4, 3), the length of the stored difference is 3, and the index (packed encoding) of the length is 2. Additionally, for a difference value range of (−8, 7), the length of the stored difference is 4, and the index (packed encoding) of the length is 3. Within Table 500, for a difference value range of (−16, 15), the length of the stored difference is 5, and the index (packed encoding) of the length is 4. Also, for a difference value range of (−32, 31), the length of the stored difference is 6, and the index (packed encoding) of the length is 5. Within Table 500, for a difference value range of (−64, 63), the length of the stored difference is 7, and the index (packed encoding) of the length is 6. Moreover, for a difference value range of all others (difference is truncated to the length, e.g., sign or any overflow bits are not kept (note that the result is still lossless for the given encoded length)), the length of the stored difference is 8, 10 or 11*, and the index (packed encoding) of the length is 7. Regarding the length asterisk (*) of Table 500, note that for 8-8-8-8 format, the length is 8; for 2-10-10-10 format, the length is 10 for RGB channels (alpha channel will not hit this case); and for 10-11-11 format, the length is 0 for alpha channel and 11 for RGB channels (10 bit B channel is treated as if it is 11 bits, to aid decorrelation). In an embodiment, the C32 format type (8-8-8-8, 2-10-10-10, or 10-11-11) will be encoded into the compressed representation for decompression. In one embodiment, when the lengths are packed, they will be encoded into indices of 3 bits each (4 bits for C64), but the actual length in bits of the differences to be stored, as described in Table 500, is utilized for the next length selection operations. It is pointed out that in one embodiment, the anchor sample's channels are stored in full so there is no need to compute a raw length for the anchor.

In an embodiment, with C64 formats, for a given difference value the raw length is defined at operation 402 as the lowest value satisfying the following values and information as shown in Table 600 of FIG. 6. For example, within Table 600, for a difference value range of zero, the length of the stored difference is zero, and the index (packed encoding) of the length is zero. Furthermore, for a difference value range of (−2, 1), the length of the stored difference is 2, and the index (packed encoding) of the length is 1. Within Table 600, for a difference value range of (−4, 3), the length of the stored difference is 3, and the index (packed encoding) of the length is 2. Moreover, for a difference value range of (−8, 7), the length of the stored difference is 4, and the index (packed encoding) of the length is 3. Within Table 600, for a difference value range of (−16, 15), the length of the stored difference is 5, and the index (packed encoding) of the length is 4. In addition, for a difference value range of (−32, 31), the length of the stored difference is 6, and the index (packed encoding) of the length is 5. Within Table 600, for a difference value range of (−64, 63), the length of the stored difference is 7, and the index (packed encoding) of the length is 6. Additionally, for a difference value range of (−128, 127), the length of the stored difference is 8, and the index (packed encoding) of the length is 7. Within Table 600, for a difference value range of (−256, 255), the length of the stored difference is 9, and the index (packed encoding) of the length is 8. Also, for a difference value range of (−512, 511), the length of the stored difference is 10, and the index (packed encoding) of the length is 9.

In addition, within Table 600, for a difference value range of (−1024, 1023), the length of the stored difference is 11, and the index (packed encoding) of the length is 10. Furthermore, for a difference value range of (−2048, 2047), the length of the stored difference is 12, and the index (packed encoding) of the length is 11. Within Table 600, for a difference value range of (−4096, 4095), the length of the stored difference is 13 or for the alpha channel it indicates a uniform alpha of 0.0, and the index (packed encoding) of the length is 12. Additionally, for a difference value range of (−8192, 8191), the length of the stored difference is 14 or for the alpha channel it indicates a uniform alpha of 1.0, and the index (packed encoding) of the length is 13. Within Table 600, for a difference value range of (−16384, 16383), the length of the stored difference is 15, and the index (packed encoding) of the length is 14. Moreover, for a difference value range of all others (difference is truncated to the length, e.g., sign or any overflow bits are not kept (note that the result is still lossless for the given encoded length)), the length of the stored difference is 16, and the index (packed encoding) of the length is 15. Regarding the length asterisks (*) of Table 600, note that for the alpha channel, these length values are reserved for alpha-uniform 0.0 and 1.0. In an embodiment, for actual raw lengths of these values in the alpha channel, the next higher length can be instead substituted. Operation 402 can be implemented in any manner similar to that described herein, but is not limited to such.

At operation 404 of FIG. 4, determine the maximum lengths of differences for each pair of samples (e.g., pairs are consecutive in the 2 subpackets, not the neighbors from the difference transformation). Note that operation 404 can be implemented in a wide variety of ways. For example, in an embodiment, each pair of horizontally consecutive samples in the 2 subpackets is reduced to one length per channel (R, R', G, B, B', A) by taking the maximum raw length of the pair:

Pair-Length=(maximum(Raw-Length(first sample)), Raw-Length(second sample))

In an embodiment, it is noted that for the pair that includes the anchor, the anchor's raw length is considered to be zero (e.g., the size of the anchor does not factor into the maximum result). Operation 404 can be implemented in any manner similar to that described herein, but is not limited to such.

At operation 406, determine the total size of all differences and lengths in the channel using lengths by pairs. It is noted that operation 406 can be implemented in a wide variety of ways. For example, in an embodiment, the total size in bits needed for the channel, including encoding the lengths and the difference bits, is first computed at operation 406 separately for each channel, R, R', G, B, B', and A, using the pair lengths:

C32 Channel-size=(8 pairs*3 bits per length)+(sum (pair-lengths)*2)−pair-length-with-anchor C64 Channel-size=(4 pairs*4 bits per length)+(sum (pair-lengths)*2)−pair-length-with-anchor Operation 406 can be implemented in any manner similar to that described herein, but is not limited to such.

At operation 408 of FIG. 4, determine the total size of all differences and lengths in the channel using the maximum length. It is pointed out that operation 408 can be implemented in a wide variety of ways. For example, in an embodiment, the total size in bits needed for each channel, R, R', G, B, B', and A, is then computed at operation 408 using a single length field for the entire channel, the maximum of all length fields.

C32 Channel-size=3 bits+(15*max-length)

C64 Channel-size=4 bits+(7*max-length)

It is noted that this encoding is particularly useful for constant value channels where all differences are zero, and removes the need for separately encoding the alpha channel as a constant or a zero or a one. In addition, in an embodiment, the size of the anchor does not factor into the result. Operation 408 can be implemented in any manner similar to that described herein, but is not limited to such.

At operation 410, perform alpha uniform encoding. Note that operation 410 can be implemented in a wide variety of ways. For example, in an embodiment, alpha values of either 0.0 or 1.0 are common enough to merit specific encoding, saving some of the storage that would otherwise be used for their anchor/length values. Because of the differences in encoding between C32 and C64, slightly different schemes are used to encode this at operation 410. For C32, in an embodiment, a separate format enum (or enumeration) is used to indicate 8-8-8-8 format with uniform alpha 0.0 or 1.0. The alpha value is indicated by reducing the anchor encoding for the alpha channel to 1-bit. The maximum length field for the alpha channel, which would be 0, is no longer needed, nor is the channel A length selection bit, which would be by maximum length. For C64, in an embodiment, since no separate format field is encoded, specific alpha channel maximum length values are co-opted, based on their appearance frequency. The anchor for the alpha channel is then no longer encoded. Operation 410 can be implemented in any manner similar to that described herein, but is not limited to such.

At operation 412 of FIG. 4, perform length encoding. It is noted that operation 412 can be implemented in a wide variety of ways. For example, in an embodiment, for each channel, R, R', G, B, B', and A, the best (e.g., lowest) total channel size is selected at operation 412, either pair-lengths or maximum length. In case of a tie, in an embodiment, maximum length is selected at operation 412 (since it might be lower power). Note that during packing a bit per channel will encode which method was used. In addition, at operation 412, to determine whether decorrelation should be used, the selected channel sizes for the decorrelated channels, R' and B', are then summed and compared to the selected sizes of the original channels, R and B. The lowest size is again chosen at operation 412, and a single bit will encode the selected method. In case of a tie, in an embodiment, "not decorrelated" is selected (since it might be lower power). In one embodiment, it is noted that decorrelation selection is either on or off (e.g., decorrelation is not done for R channel and not B, or vice versa). Operation 412 can be implemented in any manner similar to that described herein, but is not limited to such. In an embodiment, it is pointed out that once operation 412 is completed, method 100 of FIG. 1 can proceed to operation 107.

At operation 106 of FIG. 1, in an embodiment, to determine the lengths of the differences, pairs of samples within each group can be utilized to determine lengths per channel, or some type of Huffman coding can be utilized, or instead have a length per channel per group, or perform length encoding as described herein, but is not limited to such.

At operation 107 of FIG. 1, priority ordering for packing differences and lengths of samples can be performed. It is pointed out that operation 107, in an embodiment, can be performed as preparation for operation 108 in which the packing of compressed atom can be performed. In addition, note that operations 107 and 108 may be combined into a single operation. Operation 107 can be implemented in a wide variety of ways. For example, in an embodiment, a C32 format can have a priority order at operation 107 for packing differences and lengths of samples as shown below.

C32 priority order:
1/16 anchor sample: 5A
2/16 samples: 2, a
4/16 samples: d
8/16 samples: 0, 7, 8, f
16/16 remaining samples: 1, 3, 4, 6, 9, b, c, e It is pointed out that the C32 priority order shown above refers to samples shown within FIG. 2. Each arrow of FIG. 2 represents a difference between two samples while the direction of each arrow indicates what the sample is differenced with (e.g., the arrow pointing from sample "d" to sample "a" indicates that sample d is differenced with sample a). In addition, the darker shaded square of FIG. 2 indicates the anchor sample (e.g., 5A). The C32 priority order shown above includes five stages of descending priority where the one of 16 samples (1/16) stage has the highest priority and the 16 of 16 samples (16/16) stage has the lowest priority. At operation 107, in an embodiment, the C32 priority order can be utilized to progressively indicate when a defined or predefined amount of memory has run out of space for storing differences and lengths of samples within a compressed atom. Specifically, the C32 priority order at operation 107, in an embodiment, can be "progressive" in that each subsequent stage which adds bits would enhance the previous stage's representation of the 16 samples. In an embodiment, at operation 107, a determination can be made at each stage as to whether that stage's group data (e.g., difference and length of each sample of the group) can fit within a defined or predefined amount of space for a compressed atom. If so, that stage's group data can eventually be incorporated within the compressed atom at operation 108. However, if the stage's group data will cause the compressed atom to exceed the defined amount of space, that stage's group data and any lower priority stages' group data will not be included as part of the compressed atom at operation 108. Note that in an embodiment, at operation 107, one or more sample groups can be excluded based on the decreasing priority of lower-order difference groups (e.g., by virtue of their proximity to higher-order sample groups).

For example, in an embodiment, the C32 priority order at operation 107 of FIG. 1 indicates the data representing the anchor sample 5A will be stored as part of the compressed atom. If there is no more space available within the defined amount of memory, then the anchor sample 5A would be the representative of the 16 samples of FIG. 2, which will result in a lossy compression at operation 108. However, if there is more space available within the defined amount of memory, the C32 priority order at operation 107 indicates the differences and lengths data to samples 2 and "a" will be stored as part of the compressed atom. If there is no more space available, then samples 2 and "a" would be the representatives of the 16 samples of FIG. 2, which will result in a lossy compression at operation 108. However, if there is still more space available within the defined amount of memory, the C32 priority order at operation 107 indicates the difference and length data to sample "d" will be stored as part of the compressed atom. If there is no more space available, then samples d, 2, a, and 5A would be the representatives of the 16 samples of FIG. 2, which will result in a lossy compression at operation 108. However, if there is still more space available within the defined amount of memory, the C32 priority order at operation 107 indicates the differences and lengths data to samples 0, 7, 8, and "f" will be stored as part of the compressed atom. If there is no more space available, then samples 0, 7, 8, f, d, 2, a, and 5A would be the representatives of the 16 samples of FIG. 2, which will result in a lossy compression at operation 108. However, if there is yet more space available within the defined amount of memory, the C32 priority order at operation 107 indicates the differences and lengths data to samples 1, 3, 4, 6, 9, "b", "c", and "e" will be stored as part of the compressed atom. As such, samples 1, 3, 4, 6, 9, b, c, e, 0, 7, 8, f, d, 2, a, and 5A will be stored as part of the compressed atom, which will result in a lossless compression at operation 108.

In an embodiment, a C64 format can have a priority order at operation 107 of FIG. 1 for packing differences and lengths of samples as shown below.

C64 priority order:
1/8 anchor sample: 2A
2/8 samples: 1, 5
4/8 samples: 6
8/8 samples: 0, 3, 4, 7

It is pointed out that the C64 priority order shown above refers to samples shown within FIG. 3. Each arrow of FIG. 3 represents a difference between two samples while the direction of each arrow indicates what the sample is differenced with (e.g., the arrow pointing from sample 4 to sample 6 indicates that sample 4 is differenced with sample 6). Additionally, the darker shaded square of FIG. 3 indicates the anchor sample (e.g., 2A). The C64 priority order shown above includes four stages of descending priority where the one of 8 samples (1/8) stage has the highest priority and the 8 of 8 samples (8/8) stage has the lowest priority. At operation 107, in an embodiment, the C64 priority order can be utilized to progressively indicate when a defined or predefined amount of memory has run out of space for storing differences and lengths of samples within a compressed atom. Specifically, the C64 priority order at operation 107, in an embodiment, can be "progressive" in that each subsequent stage which adds bits would enhance the previous stage's representation of the 8 samples. In an embodiment, at operation 107, a determination can be made at each stage as to whether that stage's group data (e.g., difference and length of each sample of the group) can fit within a defined or predefined amount of space for a compressed atom. If so, that stage's group data can eventually be incorporated within the compressed atom at operation 108. However, if the stage's group data will cause the compressed atom to exceed the defined amount of space, that stage's group data and any lower priority stages' group data will not be included as part of the compressed atom at operation 108. It is noted that in an embodiment, at operation 107, one or more sample groups can be excluded based on the decreasing priority of lower-order difference groups (e.g., by virtue of their proximity to higher-order sample groups).

For example, in an embodiment, the C64 priority order at operation 107 of FIG. 1 indicates the data representing the anchor sample 2A will be stored as part of the compressed atom. If there is no more space available within the defined amount of memory, then the anchor sample 2A would be the representative of the 8 samples of FIG. 3, which will result in a lossy compression at operation 108. However, if there is more space available within the defined amount of memory, the C64 priority order at operation 107 indicates the differences and lengths data to samples 1 and 5 will be stored as part of the compressed atom. If there is no more space available, then samples 1 and 5 would be the representatives of the 8 samples of FIG. 3, which will result in a lossy compression at operation 108. However, if there is still more space available within the defined amount of memory, the C64 priority order at operation 107 indicates the difference and length data to sample 6 will be stored as part of the compressed atom. If there is no more space available, then samples 6, 1, 5, and 2A would be the representatives of the 8 samples of FIG. 3, which will result in a lossy compression at operation 108. However, if there is still more space available within the defined amount of memory, the C64 priority order at operation 107 indicates the differences and lengths data to samples 0, 3, 4, and 7 will be stored as part of the compressed atom. As such, samples 0, 3, 4, 7, 6, 1, 5, and 2A will be stored as part of the compressed atom, which will result in a lossless compression at operation 108.

At operation 107 of FIG. 1, in an embodiment, the priority order can be implemented such that a specific stage (e.g., of the C32 priority order, the C64 priority order, etc.) can be defined as a stopping point for the priority order. For example, in an embodiment, the 3rd stage (4/16) of the C32 priority order could be defined as a stopping point for the priority order for each performance of operation 107. As such, samples d, 2, a, and 5A would be the representatives of the 16 samples of FIG. 2 for each performance of operation 107, which will result in a lossy compression at operation 108.

At operation 107, in an embodiment, the priority order can be implemented such that instead of reducing the precision of the last groups, it could also reduce the precision of the earlier groups to fit the differences of all the samples. For example, at operation 107, instead of maintaining the precision of the full anchor and the full differences for one or more earlier samples so those samples will decompressed to their exact values, the anchor and the differences of the one or more earlier samples can be implemented lossy as well. In addition, in an embodiment, at operation 107, the anchor and the differences of one or more earlier samples can be implemented lossy while later groups of the priority order can be excluded. In an embodiment, at operation 107, a prioritized ordering of difference data can be performed to minimize loss after compression, thereby allowing a fixed memory storage compression ratio.

At operation 108 of FIG. 1, packing of compressed atom can be performed. Note that operation 108 can be implemented in a wide variety of ways. For example, in an embodiment, a field (e.g., 1 or 2-bit) can be packed at operation 108 to encode which one or more groups are included from operation 107 as part of the compression. In addition, in an embodiment, at operation 108, the groups that are not included are decoded as the difference is equal to zero. In this manner, in an embodiment, the one or more samples' values of the excluded groups can be assigned or changed to equal the values of the anchor sample group. In addition, by decoding the difference equal to zero for the groups that are not included, this is where extra space can come from because the difference really was not always zero, potentially, for the ones that are not included. At operation 108, in an embodiment, some type of marker can be encoded that indicates which one or more groups are included from operation 107 as part of the compression. At operation 108, in an embodiment, an encoding may not be used because method 100 could potentially figure out which groups were used based on the design of the storage or communication between operation 107 and 108.

At operation 108, in an embodiment, it may be desirable to utilize the extra space after fitting the last full group to minimize the lossy compression a little more. For example, the extra space after fitting the last full group could be used to pack an approximate version of the next groups differences (diffs). The approximate version can be implemented in a wide variety of ways. For example, in an embodiment, calculate N for "length(priorityGroup's diffs)/ 2^N<remaining space for diffs" and store diffs right-shifted by N, length=length-N [take into account remaining groups do not need lengths packed if this is going to be the last group]. In an embodiment, a 3 or 4 bit field could be packed to encode N (log-factor). It is noted that in an embodiment, it may be desirable to avoid blindly truncating differences since the difference may be used to wrap values across boundaries where the truncated values would cause them to go outside the range of actual sample values (e.g., which can be referred to as going out of the gamut). Since a compressor at operation 108 has all the values, in an embodiment, presumably it could choose estimates to avoid this.

In an embodiment, the packing at operation 108 of the compressed atom for C32 is shown within Table 700 of FIG. 7. For example, within Table 700, for the format (0=8-8-8-8, 1=8-8-8-8 with alpha 0.0 or 1.0, 2=2-10-10-10, 3=10-11-11), the size is 2 bits and is packed into bits 0 through 1, or for the descending half of the 512-bit 4:2 dual-subpacket, bits 510 through 511. For the channel decorrelation selection (0=not decorrelated; 1=decorrelation used, e.g., R', B' encoded), the size is 1 bit and is packed into bits 2 through 2, or for the descending half of 4:2, bits 509 through 509. Within Table 700, for the channel R length selection (0=by pairs; 1=by maximum), the size is 1 bit and is packed into bits 3 through 3, or for the descending half of 4:2, bits 508 through 508. For the channel G length selection, the size is 1 bit and is packed into bits 4 through 4, or for the descending half of 4:2, bits 507 through 507. Within Table 700, for the channel B length selection, the size is 1 bit and is packed into bits 5 through 5, or for the descending half of 4:2, bits 506 through 506. For the channel A length selection (only present if format field is 8-8-8-8 or 2-10-10-10), the size is 0 or 1 bits and is packed into a varying bit position (<var>) through bit 6, or for the descending half of 4:2, a varying bit position (<var>) through bit 505.

Additionally, within Table 700, for the lengths for channel R (8*3 bits if by pairs; 3 bits if by maximum), the size is 24 or 3 bits and is packed into a varying bit position (<var>) through a varying bit position (<var>), or for the descending half of the 512-bit 4:2 dual-subpacket, a varying bit position (<var>) through a varying bit position (<var>). For the lengths for channel G (8*3 bits if by pairs; 3 bits if by maximum), the size is 24 or 3 bits and is packed into a varying bit position through a varying bit position, or for the descending half of 4:2, a varying bit position through a varying bit position. Within Table 700, for the lengths for channel B (8*3 bits if by pairs; 3 bits if by maximum), the size is 24 or 3 bits and is packed into a varying bit position through a varying bit position, or for the descending half of 4:2, a varying bit position through a varying bit position. For the lengths for channel A (8*3 bits by pairs; 3 bits if by maximum; zero bits if format is with alpha 0/1 or 10-11-11), the size is 24, 3, or zero bits and is packed into a varying bit position through a varying bit position, or for the descending half of 4:2, a varying bit position through a varying bit position.

Furthermore, within Table 700, for the anchor R channel, R' stored if decorrelation selected, the size is 8, 8, 10, or 11 bits, respectively by format, and is packed into a varying bit position (<var>) through a varying bit position (<var>), or for the descending half of the 512-bit 4:2 dual-subpacket, a varying bit position (<var>) through a varying bit position (<var>). For the anchor G channel, the size is 8, 8, 10, or 11 bits, respectively by format, and is packed into a varying bit position through a varying bit position, or for the descending half of 4:2, a varying bit position through a varying bit position. Within Table 700, for the anchor B channel, B' stored if decorrelation selected, the size is 8, 8, 10, or 11 bits, respectively by format, and is packed into a varying bit position through a varying bit position, or for the descending half of 4:2, a varying bit position through a varying bit position. For the anchor A channel, the size is 8, 1, 2, or 0 bits, respectively by format, and is packed into a varying bit position through a varying bit position, or for the descending half of 4:2, a varying bit position through a varying bit position. Within Table 700, for the consecutively bit-packed differences, according to the lengths selected for each channel-pair *, the size is the remaining bits and is packed into a varying bit position through a varying bit position, or for the descending half of 4:2, a varying bit position through a varying bit position. Regarding the asterisk (*) of Table 700, note that this can be by channel first order (matching the packing order of lengths). In another embodiment, the order could be sample first (with all channels of each sample before the next sample). In an embodiment, it is pointed out that if length selection is by pairs, the lengths are packed in order in step with the increasing byte order of the pairs of samples within the subpackets.

In an embodiment, the packing at operation 108 of the compressed atom for C64 is shown within Table 800 of FIG. 8. For example, within Table 800, for the channel decorrelation selection (0=not decorrelated; 1=decorrelation used, e.g., R', B' encoded), the bit size is 1 bit and is packed into bits 0 through 0, or for the descending half of the 512-bit 4:2 dual-subpacket, bits 511 through 511. For the channel R length selection (0=by pairs; 1=by maximum), the bit size is 1 bit and is packed into bits 1 through 1, or for the descending half of 4:2, bits 510 through 510. Within Table 800, for the channel G length selection, the bit size is 1 bit and is packed into bits 2 through 2, or for the descending half of 4:2, bits 509 through 509. For the channel B length selection, the bit size is 1 bit and is packed into bits 3 through 3, or for the descending half of 4:2, bits 508 through 508. Within Table 800, for the channel A length selection, the bit size is 1 bit and is packed into bits 4 through 4, or for the descending half of 4:2, bits 507 through 507.

In addition, within Table 800, for the lengths for channel R (4*4 bits if by pairs; 4 bits if by maximum), the size is 16 or 4 bits and is packed into a varying bit position (<var>) through bit 5, or for the descending half of the 512-bit 4:2 dual-subpacket, a varying bit position (<var>) through bit 506. For the lengths for channel G (4*4 bits if by pairs; 4 bits if by maximum), the size is 16 or 4 bits and is packed into a varying bit position (<var>) through a varying bit position (<var>), or for the descending half of 4:2, a varying bit position (<var>) through a varying bit position (<var>). Within Table 800, for the lengths for channel B (4*4 bits if by pairs; 4 bits if by maximum), the size is 16 or 4 bits and is packed into a varying bit position through a varying bit position, or for the descending half of 4:2, a varying bit position through a varying bit position. For the lengths for channel A (4*4 bits if by pairs; 4 bits if by maximum), the size is 16 or 4 bits and is packed into a varying bit position through a varying bit position, or for the descending half of 4:2, a varying bit position through a varying bit position.

Moreover, within Table 800, for the anchor R channel, R' stored if decorrelation selected, the size is 16 bits and is packed into a varying bit position (<var>) through a varying bit position (<var>), or for the descending half of the 512-bit 4:2 dual-subpacket, a varying bit position (<var>) through a varying bit position (<var>). For the anchor G channel, the size is 16 bits and is packed into a varying bit position (<var>) through a varying bit position (<var>), or for the descending half of 4:2, a varying bit position (<var>) through a varying bit position (<var>). Within Table 800, for the anchor B channel, B' stored if decorrelation selected, the size is 16 bits and is packed into a varying bit position through a varying bit position, or for the descending half of 4:2, a varying bit position through a varying bit position. For the anchor A channel, zero bits if maximum length indicates uniform 0.0 or 1.0, the size is 16 or 0 bits and is packed into a varying bit position through a varying bit position, or for the descending half of 4:2, a varying bit position through a varying bit position. Within Table 800, for the consecutively bit-packed differences, according to the lengths selected for each channel-pair *, the size is zero to 171 bits (or more for 4:2) and is packed into a varying bit position through a varying bit position, or for the descending half of 4:2, a varying bit position through a varying bit position. Regarding the asterisk (*) of Table 800, note that this can be by channel first order (matching the packing order of lengths). In an embodiment, it is noted that progressive lossy memory compression succeeds if the packing fits within one subpacket, 256 bits (this is changed for a 4:2 compression atom, which is described below). It is pointed out that the success can be determined before packing through a summing of the best total sizes calculated in the preceding step or operation, plus the fixed length fields shown in the packing tables above.

Figure 9:
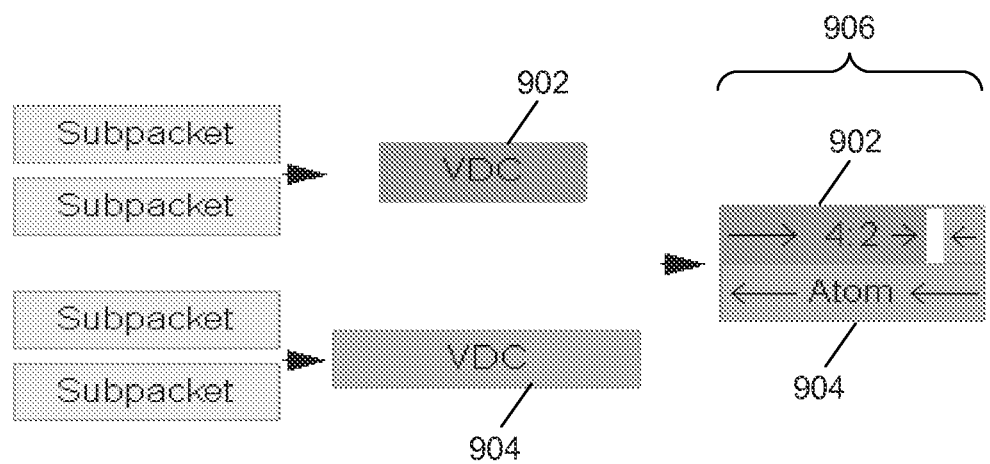
FIG. 9 is a block diagram illustrating a packing in accordance with an embodiment of the invention.

In an embodiment, the packing at operation 108 can be implemented as shown in FIG. 9, which is a block diagram illustrating a 4:2 packing in accordance with an embodiment of the invention. Specifically, since progressive lossy memory (e.g., frame buffer) compression uses varying sized bit fields, there are cases where it under-uses a single compressed subpacket. In these cases it is desirable to allow another compressed atom to overflow into the under-utilized subpacket. The 4:2 packing is a straightforward packing of 2 separately compressed 2:1 atoms (e.g., 902 and 904) into a single 2-subpacket compression atom 906, as shown in FIG. 9. In an embodiment, the second 2:1 atom 904 is packed with fields descending from the end of the 4:2 atom 906 in order to allow decompression to skip directly to either atom, without requiring extra storage for sizing information. In an embodiment, the size can be limited of each 2:1 portion of a 4:2 packed atom in order to save area in the compressor and/or decompressor of a graphics subsystem (e.g., 1050). In an embodiment, it is noted that simulations show that a 2:1 compression atom (e.g., 902 and 904) in 4:2 packing should be allowed to span up to 384 bits. In one embodiment, only 40 bits may overflow (e.g., up to 296 bits per 2:1 atom). Implemented in this manner, compress-ability is sacrificed, but the chip area used is much less. Operation 108 can be implemented in any manner similar to that described herein, but is not limited to such.

In an embodiment, it is noted that the lossy compression format of operations 107 and 108 can be "progressive" in that each subsequent stage (e.g., C32 priority order, C64 priority order, etc.) which adds bits would enhance the previous stage's representation, and the compression could halt at any point beyond the minimum atom (1 subpacket), e.g., to ensure there will be a compressed representation. This type of progressive lossy compression in various embodiments can be used to reduce the storage footprint and/or save further on memory bandwidth. It is pointed out that the storage footprint savings are potentially desirable for newer anti-aliasing options and/or path rendering.

At operation 110, tile success check can be performed. It is noted that operation 110 can be implemented in a wide variety of ways. For example, in an embodiment, in the case of a 2:1 compression atom, all 4 pairs of subpackets in a tile compress at operation 110 to 1 subpacket each in order for the tile to be written to the progressive lossy frame buffer compressed state. In one embodiment, in the case of a 4:2 compression atom, both sets of 4 subpackets compress at operation 110 to 2 subpackets each in order for the tile to be written to the progressive lossy frame buffer compressed state. It is pointed out that in various embodiments, 4:2 and 2:1 compression atoms are not present at the same time in a system, so there is no need to differentiate the compression state between them. Another embodiment could encode the state of the compression and allow both 4:2 and 2:1 compression atoms to be present at the same time. Operation 110 can be implemented in any manner similar to that described herein, but is not limited to such.

Note that method 100 and/or method 400 can be further modified in a wide variety of ways. For example, in various embodiments, the anchor sample can be packed to some smaller fixed sizes and one or more bits may be utilized to describe the anchor's packing. In an embodiment, the description of the anchor's packing can include, but is not limited to, adding a bit field to describe that the anchor is packed as full size (e.g., 32 bits for C32, 64 bits for C64), or other sizes determined by data mining, such as, but is not limited to, 24 bits for C32 (e.g., no alpha necessary).

It is noted that method 100 and/or method 400 can be further modified in a wide variety of ways. For example, in various embodiments, there could be a length selection to use just one (or a single) maximum length for all of R, G, B when decorrelation is not being used, or with decorrelation, one (or a single) maximum length for just R and B. In an embodiment, this could save 4 bits, minus 1 additional bit for encoding this type of implementation.

It is pointed out that method 100 and/or method 400 can be further modified in a wide variety of ways. For example, in various embodiments, some of the common length patterns observed from data mining may be fixed or "hard-coded". For example, in an embodiment, the one or more fixed length patterns can be substituted for the length decoder values. As such, in an embodiment, this can remove the need to pack the lengths, other than a field describing which fixed length set to use.

It is noted that method 100 can be further implemented with other operations. For example, in an embodiment, "BOTH" compression can be implemented wherein it is applied only to tiles that were already compressed by other means, such as a simple reduction from multiple samples of a pixel to one sample value per pixel. In an embodiment, progressive lossy frame buffer compression in BOTH compression is 2:1 since there are only 2 subpackets to be compressed per tile, after 4 samples per pixel were reduced to 1 sample per pixel.

In addition, method 100 can be further implemented to include fast-clears. In an embodiment, fast-clears are single-subpacket transactions that are received by a level two cache (LTC) (e.g., located within a graphics processor 1051) or a frame buffer interface that can clear one or more tiles (e.g., 4 tiles, or 1024 bytes). Even though the transaction is a full subpacket, there is one clear color being used for every sample in the subpacket. Also, despite receiving one sub-packet for one or more tiles, the LTC or frame buffer interface may need to expand the fast-clear to write to each tile. When it does so it will write the tiles to the best compression method that could be determined. It is noted that in an embodiment, for formats that allow BOTH compression, every fast-clear transaction should be representable as BOTH compression with a progressive frame buffer compression encoding, by storing the anchor sample with all difference lengths of 0 (using maximum length selection), and decorrelation disabled. In an embodiment, other equivalent encodings of clear values are also possible.

Figure 10:
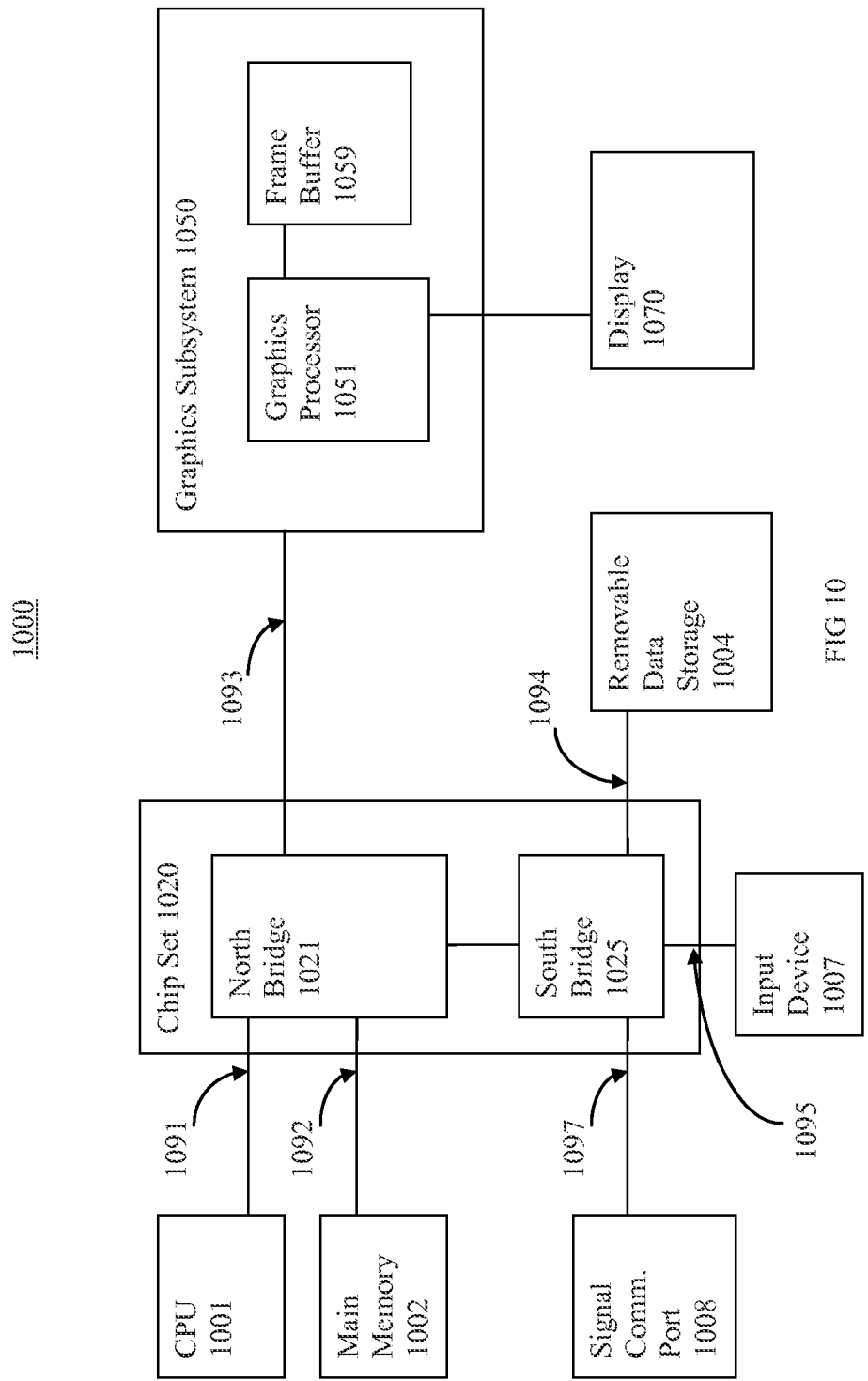
FIG. 10 is a block diagram of a computer system in accordance with an embodiment of the invention upon which embodiments of the invention can be implemented.

FIG. 10 is a block diagram of a computer system 1000, one embodiment of a computer system upon which embodiments of the invention can be implemented. Computer system 1000 includes a central processor unit (CPU) 1001, main memory 1002 (e.g., random access memory), a chip set 1020 with north bridge 1021 and south bridge 1025, removable data storage device 1004, input device 1007, a signal communications port 1008, and graphics subsystem 1050 which is coupled to a display 1070. Computer system 1000 includes several busses for communicatively coupling the components of computer system 1000. Communication bus 1091 (e.g., a front side bus) couples the north bridge 1021 of chipset 1020 to the central processor unit 1001. Communication bus 1092 (e.g., a main memory bus) couples the north bridge 1021 of the chipset 1020 to the main memory 1002. Communication bus 1093 (e.g., the Advanced Graphics Port interface) couples the north bridge of the chipset 1020 to the graphic subsystem 1050. Communication buses 1094-1097 (e.g., a PCI bus) couple the south bridge 1025 of the chip set 1020 to the removable data storage device 1004, input device 1007, signal communications port 1008, respectively. Graphics subsystem 1050 includes graphics processor 1051, memory management unit 1055, and graphics buffer 1059.

The components of computer system 1000 cooperatively operate to perform a variety of processing tasks and facilitate efficient memory accesses. Communications bus 1091, 1092, 1093, 1094, 1095 and 1097 communicate information. The central processor 1001 processes information. The main memory 1002 stores information and instructions for the central processor 1001. The removable data storage device 1004 also stores information and instructions (e.g., functioning as a large information reservoir). The input device 1007 provides a mechanism for inputting information and/or for pointing to or highlighting information on the display 1070. The signal communication port 1008 provides a communication interface to exterior devices (e.g., an interface with a network). The display device 1070 displays information in accordance with data stored in the frame buffer 1059. The graphics processor 1051 processes graphics commands from central processor 1001 and provides the resulting data to the graphics buffers 1059 for storage and retrieval by the display monitor 1070.

It is appreciated that the present invention can be implemented in a variety of embodiments. In one exemplary implementation the present invention can be utilized in processing systems utilized to provide a variety of graphics applications including video games. For example, the present invention can be utilized to disable defective components in a game console, personal computer, personal digital assistant, cell phone or any number of platforms for implementing a video game. It is also appreciated that references to video game application implementations are exemplary and the present invention is not limited to these implementations.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computing system, or similar electronic computing device, that manipulates and transforms data represented as physical (electronic) quantities within the computing system's registers and memories into other data similarly represented as physical quantities within the computing system memories or registers or other such information storage, transmission or display devices.

Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The foregoing descriptions of various specific embodiments in accordance with the invention have been presented for purposes of illustration and description. They are not intended to be exhaustive or to limit the invention to the precise forms disclosed, and many modifications and variations are possible in light of the above teaching. The invention is to be construed according to the Claims and their equivalents.

What is claimed is:

1. A method comprising:
performing difference transformation of image samples;
performing length selection;
performing a prioritized ordering of difference data, said prioritized ordering comprises a defined stopping point for said prioritized ordering that excludes a plurality of image samples; and
performing packing that comprises utilizing varying sized bit fields to produce a lossy compressed representation.

2. The method of claim 1, wherein said image samples comprise stencil data.

3. The method of claim 1, wherein said image samples comprise color data.

4. The method of claim 1, wherein said performing a prioritized ordering of difference data comprises reducing precision of a difference of a first image sample relative to a second image sample.

5. The method of claim 1, wherein said performing packing comprises changing a value of a first image sample to equal a value of a second image sample.

6. The method of claim 1, wherein said performing packing comprises packing an approximate version of a difference.

7. The method of claim 1, wherein said performing packing comprises packing an approximate version of a group's differences.

8. A system comprising:
a graphics processor;
a frame buffer coupled to said graphics processor;
said graphics processor for performing a method comprising:
performing difference transformation of image samples;
performing length selection;
performing a prioritized ordering of difference data, said prioritized ordering comprises a defined stopping point for said prioritized ordering that excludes a plurality of image samples; and
performing packing that comprises utilizing varying sized bit fields to produce a lossy compressed representation.

9. The system of claim 8, wherein said image samples comprise stencil data.

10. The system of claim 9, wherein said image samples comprise color data.

11. The system of claim 8, wherein said performing a prioritized ordering of difference data comprises reducing precision of a difference of a first image sample relative to a second image sample.

12. The system of claim 8, wherein said performing packing comprises changing a value of a first image sample to equal a value of a second image sample.

13. The system of claim 8, wherein said performing packing comprises packing an approximate version of a difference.

14. The system of claim 8, wherein said image samples comprise depth data.

15. A method comprising:
performing difference transformation of image samples;
performing length selection which comprises performing length encoding;
performing a prioritized ordering of difference data, said prioritized ordering comprises a defined stopping point for said prioritized ordering that excludes a plurality of image samples; and
performing packing that comprises utilizing varying sized bit fields to produce a lossy compressed representation.

16. The method of claim 15, wherein said image samples comprise stencil data.

17. The method of claim 15, wherein said image samples comprise color data.

18. The method of claim 15, wherein said performing packing comprises changing a value of a first image sample to equal a value of a second image sample.

19. The method of claim 15, wherein said image samples comprise depth data.

20. The method of claim 15, wherein said performing packing comprises packing an approximate version of a difference.

* * * * *